(12) United States Patent
Price et al.

(10) Patent No.: US 7,670,651 B2
(45) Date of Patent: Mar. 2, 2010

(54) WATERBORN COATING CONTAINING MICROCYLINDRICAL CONDUCTORS

(75) Inventors: Ronald R. Price, Stevensville, MD (US); Paul E. Schoen, Alexandria, VA (US); Joel M. Schnur, Burke, VA (US); Anne W. Kusterbeck, Annadale, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 859 days.

(21) Appl. No.: 10/863,848

(22) Filed: Jun. 4, 2004

(65) Prior Publication Data
US 2005/0272846 A1 Dec. 8, 2005

(51) Int. Cl.
*C08K 3/08* (2006.01)

(52) U.S. Cl. .................. 427/421.1; 524/439; 427/180; 428/313.3

(58) Field of Classification Search .............. 427/421.1, 427/427.4; 428/313.3, 315.5; 174/32
See application file for complete search history.

(56) References Cited

U.S. PATENT DOCUMENTS

| | | | | |
|---|---|---|---|---|
| 3,725,308 A | * | 4/1973 | Ostolski | ............... 252/513 |
| 4,715,989 A | | 12/1987 | Sullivan et al. | |
| 4,943,612 A | * | 7/1990 | Morita et al. | ............... 524/714 |
| 4,950,423 A | | 8/1990 | Sullivan | |
| 5,120,578 A | * | 6/1992 | Chen et al. | ............... 427/304 |
| 5,269,935 A | * | 12/1993 | Clough et al. | ............... 210/653 |
| 5,512,619 A | * | 4/1996 | DeWacker et al. | ............ 524/56 |
| 5,827,997 A | * | 10/1998 | Chung et al. | ................ 174/388 |
| 6,261,508 B1 | | 7/2001 | Featherby et al. | |
| 6,452,564 B1 | | 9/2002 | Schoen et al. | |
| 6,896,928 B2 | * | 5/2005 | Allaire et al. | ............... 427/154 |
| 2004/0071949 A1 | * | 4/2004 | Glatkowski et al. | ....... 428/313.3 |
| 2004/0086670 A1 | * | 5/2004 | Choi et al. | ................. 428/35.7 |
| 2005/0048218 A1 | * | 3/2005 | Weidman | .................... 427/446 |
| 2005/0064152 A1 | * | 3/2005 | Aylward et al. | .......... 428/195.1 |

OTHER PUBLICATIONS

Browning et al, "Fabrication and Radio Frequency Characterization of High Dielectric Loss Tubule-Based Composites Near Percolation", Journal of Applied Physics, Dec. 1, 1998, pp. 6109-6113, vol. 84, No. 11.
Ho et al, "Artificial Dielectrics of Conductive Fibers in Polymers: Effects of Viscosity and Matrix Composition on Poermittivity and Loss", Journal of Materials Research, Feb. 1996, pp. 469-474, vol. 11, No. 2.

* cited by examiner

*Primary Examiner*—Tim H Meeks
*Assistant Examiner*—Nathan T Leong
(74) *Attorney, Agent, or Firm*—John J. Karasek; Joseph T. Grunkemeyer

(57) ABSTRACT

A composition is provided having cylindrically shaped metal or metal-coated particles and a polymer latex dispersion. A coating is provided having cylindrically shaped metal or metal-coated particles and a polymer matrix formed from a latex dispersion. The particles form a continuous, conductive network. A method of electromagnetic shielding is provided having the steps of providing the above composition, applying the composition to a surface, and drying the applied composition.

36 Claims, 2 Drawing Sheets

WATERBORN COATING CONTAINING MICROCYLINDRICAL CONDUCTORS

BACKGROUND OF THE INVENTION

1. Field of the Invention

The invention is a coating that can be used for electromagnetic shielding.

2. Description of the Prior Art

Current methodologies for the prevention of electronic eavesdropping consist of the use of metal sheeting, metallic screening, vapor deposited metallic films, and the use of very high loadings of metallic particulates for the attenuation of signals from structures. Such methods provide for the blockage of electromagnetic radiation but most often do not offer the ease of installation or a reasonable cost structure to permit retrofitting to a wide range of existing facilities without extensive physical modification of the structure. Due to increased risks from electronic sensing and eavesdropping in times of heightened security and increased incidence of industrial espionage it is desirable to protect commercial, governmental and military data from eavesdropping. Currently with the increased use of office automation that radiates electromagnetic energy, it is possible to intercept confidential or secret information by passive or active electronic means. To this end, the exterior and interior walls of a facility may be rendered opaque to the radiated energy in a manner sufficient to provide for the security of data produced on devices in the facility.

SUMMARY OF THE INVENTION

There is provided a composition comprising cylindrically shaped metal or metal-coated particles and a polymer latex dispersion.

There is also provided a coating comprising cylindrically shaped metal or metal-coated particles and a polymer matrix formed from a latex dispersion; wherein the particles form a continuous, conductive network.

There is further provided a method of electromagnetic shielding comprising the steps of: providing a composition comprising cylindrically shaped metal or metal-coated particles and a polymer latex dispersion; applying the composition to a surface; and drying the applied composition.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

The composition of the present invention may be a water based coating that is VOC free and which may be applied to a range of surfaces such as wallboard, wood, plywood, previously painted or plastered surfaces, masonry surfaces, glass, and plastic surfaces in such a manner that it would not be obvious that such surface contained a coating designed to protect electronic contents. A coating made from drying the composition can have the ability to interact with electromagnetic radiation and to either transmit that radiation or to attenuate the radiation in such a manner that it provides anti-eavesdropping protection to structures in which it is utilized as a coating. The frequency range of the coating may be rather broadband as the coating by design may develop a random trabecular network of electronically conducting paths of assorted orientation and path lengths.

Figure 1:
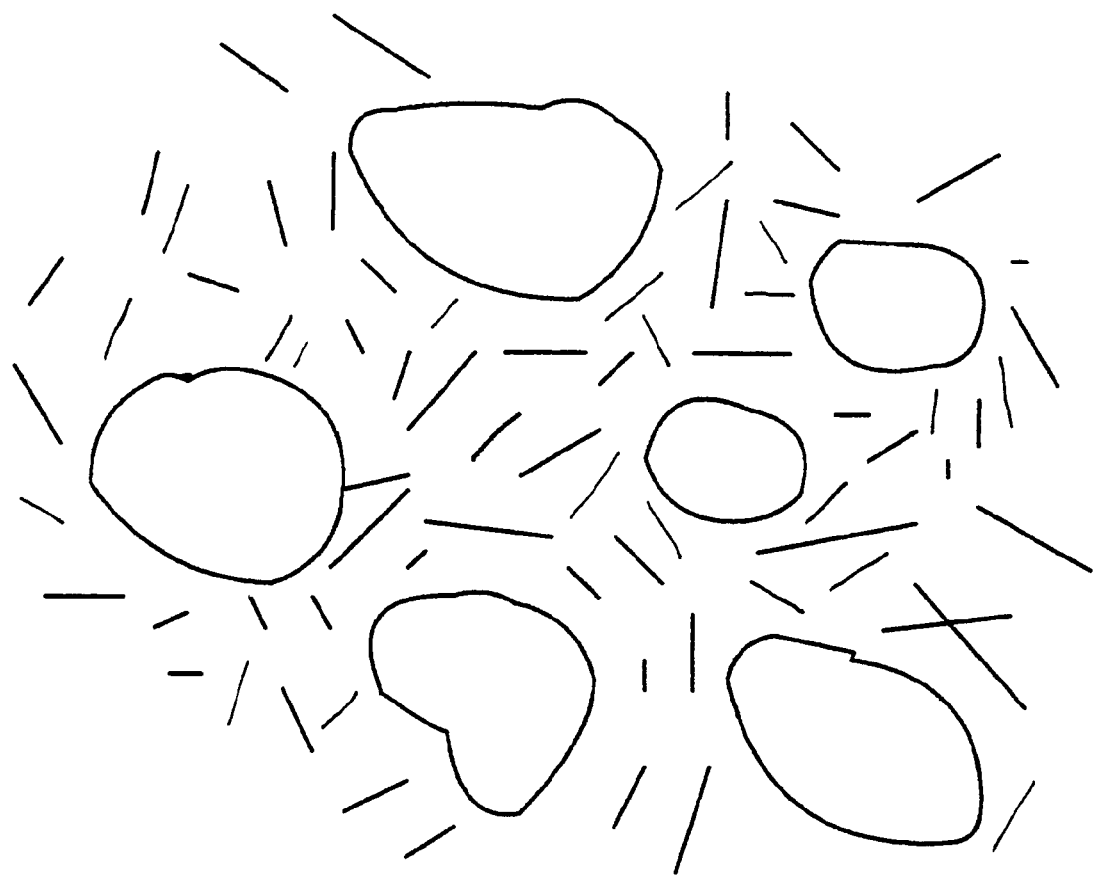
FIG. 1 schematically illustrates the arrangement of latex particles and metal particles in wet form.
Figure 2:
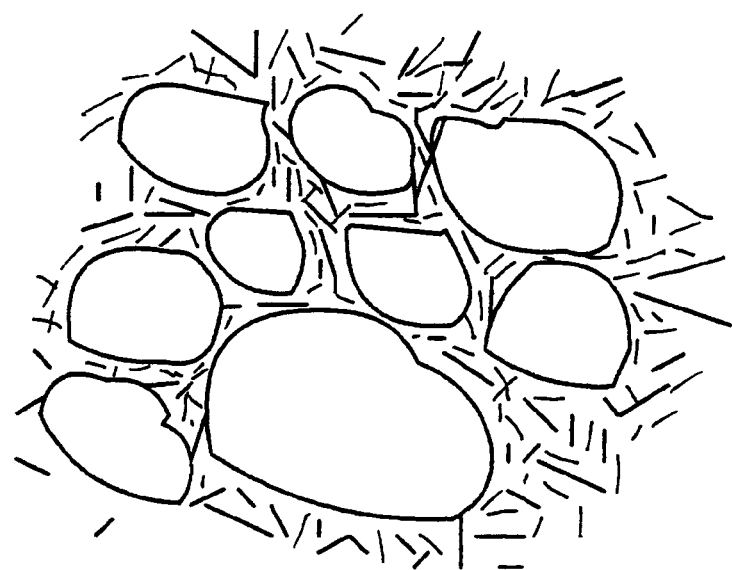
FIG. 2 schematically illustrates the arrangement of latex particles and metal particles in dry form.

Two features of the coating permit it to function at low metallic loadings. The first feature is that a conductive network can be formed from hollow metallic cylinders, which may be microscopic, have a high aspect ratio, and a surface texture that will allow contact between cylinders. The second feature is the use of a diluted polymer latex matrix that can physically restrict the microcylinders to the fraction of the coating containing the solvent matrix, as shown in FIG. 1. As the coating dries it tends to segregate the metallic microcylinders to a restricted area between the latex particles and thus concentrates the microcylinders into a restricted space that tends to force contact and locally increase their concentration, as shown in FIG. 2. By concentrating the microcylinders within the coating, the amount of microcylinders required to form conductive networks can be reduced when compared to very small metallic particulates. This is possible due to the fact that a majority of the initial coating may be solvent which as it evaporates causes a loss of volume which forces the tubules and polymer latex into contact, with the coalescence of the coating. The microcylinders may be compressed in the former solvent filled space and are then held in that orientation in the finished polymer coating. This tends to reduce both the weight and the bulk of the coating.

In addition, the coating may provide shielding for personnel within such a facility from the use of electronic personnel location devices such that the number or location of persons within the facility could not be determined from external detectors.

The metallic microcylinders may comprise, but is not limited to, any of iron, nickel, copper, and permalloy and may be over coated with silver, gold, or cobalt in order to provide for a reduction in oxidation. The size of the particles may be, but is not limited to, at most about 200 µm in length and from about 0.005 to about 1 µm in diameter. The aspect ratio of the particles may be, but is not limited to, from about 10 to about 100. The coating also may consist of conductive metallic cylinders or cylinders that are made from magnetic materials or a combination.

The microtubules can be made from membrane-forming biomaterials, such as lipids. These microtubules are biologically derived, hollow organic cylinders of about half-micron diameter and lengths of tens to hundreds of microns. The cylinders are coated with metal to render them conductive by an electroless process. Once metallized, the microtubules can be dried to a powder and dispersed into polymer matrices at varying loading densities to form the composition. In addition, the base lipid cylinders may be filled electrophoretically with magnetic iron nanoparticulates and then subsequently coated with a conductive species. The tubules may also be made from cotton linters, which are cellulose fibers with diameters of about 20 micrometers and lengths of 100 to 500 micrometers.

A further embodiment is that the tubes may be filled with antioxidant material to inhibit oxidation of the metal, or with a range of materials to inhibit bacterial growth, or may contain fungicides or mildewcides to enhance the performance of the interior coating and to aid in the control of fungus or mold that may be toxic to occupants.

The coating may be formed from either an acrylic or urethane polymer latex or combinations thereof. Other suitable latex polymers include, but are not limited to, chitothane polymers (a urethane made in water with a blocked isocyanate) and biodegradable urethane polymers derived from a naturally occurring polysaccharide. The polymer may be degradable by enzymatic means.

Suitable solvents include, but are not limited to, water, one or more alcohols, and glycol. A surfactant may also be present.

The composition may be formulated so that the percentage of the conductive material ranges between 0.5 and 25% by weight of the nonvolatile components of the latex paint base. The composition solids may be in the range of 25-60%, prior to dilution for spraying. The coating may have the advantage that the metallic microcylinders are lighter than solid metallic powders and may form an electoconductive matrix at a lower percent of loading than that required for powders.

The resulting matrix may exhibit a bulk resistively between 0.5 Ohms and 20,000 Ohms per centimeter as measured 48 hours after reaching a final dry weight.

The emulsion may be applied by spraying utilizing conventional high pressure spraying, low-pressure high volume spray equipment, or airless spray equipment. Once sprayed on a surface the coating may be over coated with a further layer of the latex emulsion to act as a moisture/chemical barrier to increase the resistance to chemical or oxidative degradation. In addition, the coating may be over coated with conventional interior or exterior surface coating to hide the active coating and for decorative purposes.

The ability to apply the coating as a spray makes this means of attenuation easier to retrofit to existing structures than metallic sheeting or screening. The latex, if chosen correctly, along with the use of a water or alcohol diluents may not cause a strong objectionable odor and thus may be applied in a closed space without undue disruption to the occupants. Because the material may be applied by spray it may be applied to flat planar surfaces or surfaces of complex shapes easily. Thus, it may be adapted to application in a wide range of conditions.

A further application would allow the coating to be easily tailored by orientation of the tubules in a strong magnetic field during application.

Figure 3:
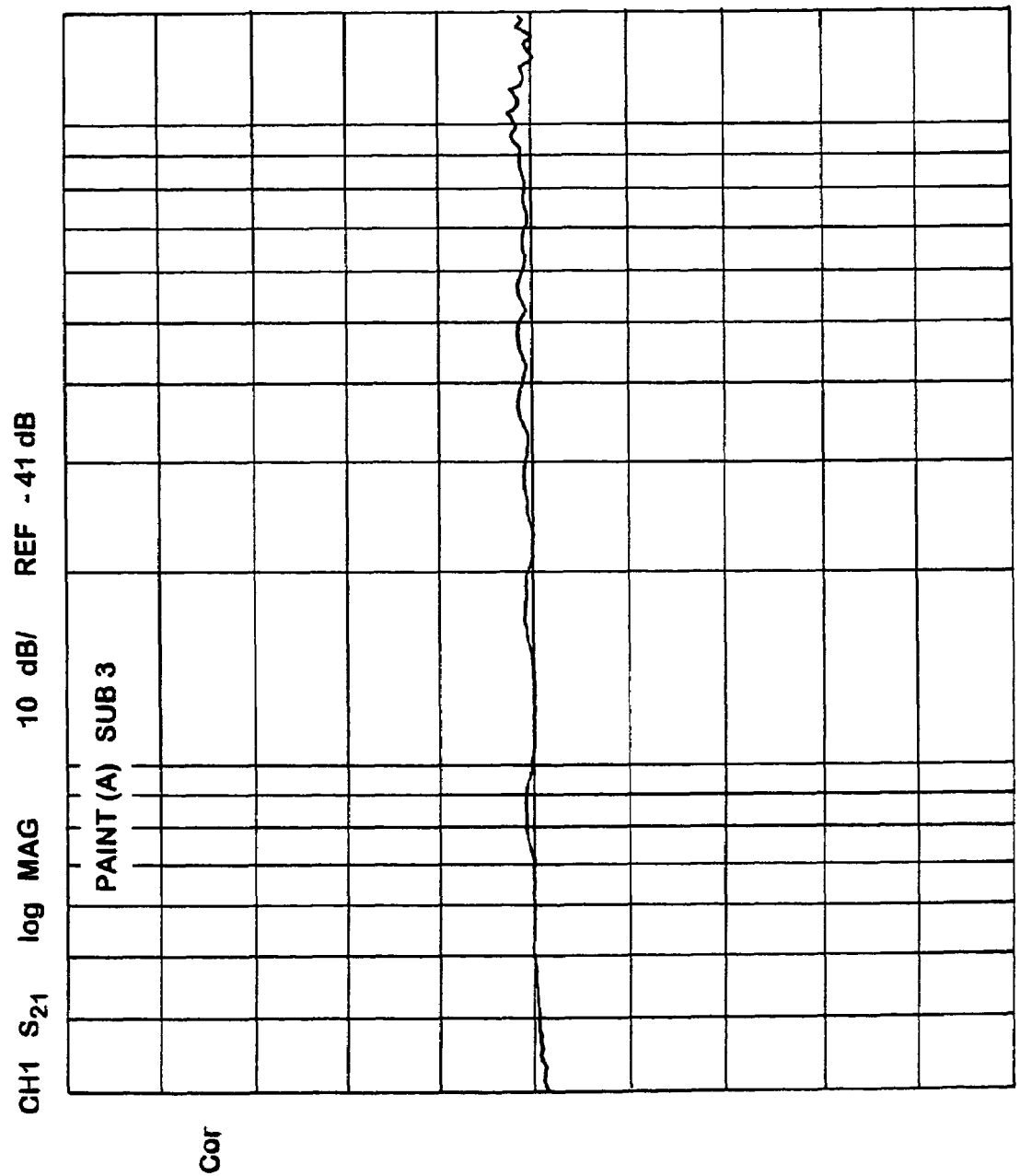
FIG. 3 shows an absorbance test of a latex/metal coating.

When sprayed to a thickness between 100 microns and 1 mm the coating can yield a broadband attenuation of electromagnetic radiation of at least 40 dB. FIG. 3 is an absorbance test that was done on an actual coating sample that was sprayed on a Mylar sheet and tested in a laboratory setting.

Having described the invention, the following examples are given to illustrate specific applications of the invention. These specific examples are not intended to limit the scope of the invention described in this application.

EXAMPLE 1

Formation of microcylinders—Microtubules were formed from diacetylenic lipid (1,2 bis(tricosa-10, 12-diynoyl)-sn-glycero-3-phosphocholine), or DC8,9PC. The lipid was dissolved in alcohol at 50° C., water was added, and the temperature was lowered to room temperature. The lipid self-assembled itself into microtubules and subsequently precipitated. The particles were rinsed and coated with a palladium catalyst and mixed with metal ions and reductants. In contact with the catalyst, the metal ions were reduced to neutral metal on the surface of the microtubules and coated the structure with a conductive layer of metal of several tenths of a micron thickness. Several other metal species are available for use in this process, including nickel and copper.

EXAMPLE 2

Formation of paint—The paint was formed from a mixture of the following ingredients: 5.25 grams of copper microcylinders made by the method of Example 1, 100 mL of 36% solids acrylic-urethane latex copolymer, 200 mL of 2-propanol or water as a diluent, and 1% (w/w) Tween 20 surfactant.

EXAMPLE 3

Formation of paint—The paint was formed from a mixture of the following ingredients: 3.31 grams of copper microcylinders made by the method of Example 1, 100 mL of 40% solids urethane latex polymeric solution, and 1% BYK surfactant.

EXAMPLE 4

Shielding properties—FIG. 3 shows the results of an absorbance test of a latex/metal coating.

Obviously, many modifications and variations of the present invention are possible in light of the above teachings. It is therefore to be understood that the claimed invention may be practiced otherwise than as specifically described.

We claim:

1. A composition comprising:
   cylindrically shaped hollow metal particles or cylindrically shaped hollow metal-coated particles; and a polymer latex dispersion.
2. The composition of claim 1, wherein the particles comprise one or more metals selected from the group consisting of copper, iron, nickel, permalloy, silver, gold, and cobalt.
3. The composition of claim 1, wherein the particles are metal-coated membrane-forming biomaterials.
4. The composition of claim 1, wherein the particles are at most about 200 µm in length and from about 0.005 to about 1 µm in diameter.
5. The composition of claim 1, wherein the particles have an aspect ratio of from about 10 to about 100.
6. The composition of claim 1, wherein the polymer latex dispersion comprises an acrylic, a polyurethane polymer, a chitothane polymer, or a combination thereof.
7. The composition of claim 1, wherein the polymer latex dispersion comprises a biodegradable urethane polymer derived from a naturally occurring polysaccharide.
8. The composition of claim 7, wherein said polymer latex dispersion is degradable by enzymatic means.
9. The composition of claim 1, wherein the polymer latex dispersion comprises water, one or more alcohols, glycol, or a combination thereof.
10. The composition of claim 1, wherein the composition comprises nonvolatile components being up to about 60% by weight of the composition.
11. The composition of claim 1,
    wherein the composition comprises nonvolatile components including the particles; and
    wherein the particles are at most about 25% by weight of the nonvolatile components of the composition.
12. The composition of claim 1, further comprising a surfactant.
13. A coating comprising: cylindrically shaped hollow metal particles or cylindrically shaped hollow metal-coated particles; and a polymer matrix formed from a latex dispersion;
    wherein the particles form a continuous, conductive network.

14. The coating of claim 13, wherein the particles are hollow.

15. The coating of claim 13, wherein the particles are metal-coated membrane-forming biomaterials.

16. The coating of claim 13, wherein the particles are at most 200 μm in length and from about 0.005 to about 1 μm in diameter.

17. The coating of claim 13, wherein the particles have an aspect ratio of from about 10 to about 100.

18. The coating of claim 13, wherein the polymer matrix comprises an acrylic polymer.

19. The coating of claim 13, wherein the polymer matrix comprises a polyurethane polymer.

20. The coating of claim 13, wherein the polymer matrix comprises a biodegradable urethane polymer derived from a naturally occurring polysaccharide.

21. The coating of claim 20, wherein said polymer matrix is degradable by enzymatic means.

22. The coating of claim 13, wherein the particles are at most about 25% by weight of the coating.

23. The coating of claim 13, wherein the coating provides broadband electromagnetic attenuation of at least about 40 dB.

24. A method of electromagnetic shielding comprising the steps of:
   providing a composition comprising:
      cylindrically shaped hollow metal particles or cylindrically shaped hollow metal-coated particles; and
      a polymer latex dispersion;
   applying the composition to a surface; and
   drying the applied composition.

25. The method of claim 24, wherein the particles comprise one or more metals selected from the group consisting of copper, iron, nickel, permalloy, silver, gold, and cobalt.

26. The method of claim 24, wherein the particles are metal-coated membrane-forming biomaterials.

27. The method of claim 24, wherein the particles are at most 200 μm in length and from about 0.005 to about 1 μm in diameter.

28. The method of claim 24, wherein the particles have an aspect ratio of from about 10 to about 100.

29. The method of claim 24, wherein the latex comprises an acrylic latex.

30. The method of claim 24, wherein the latex comprises a polyurethane latex.

31. The method of claim 24, wherein the polymer latex dispersion comprises a biodegradable urethane polymer derived from a naturally occurring polysaccharide.

32. The method of claim 31, wherein said polymer latex dispersion is degradable by enzymatic means.

33. The method of claim 24, wherein the polymer latex dispersion comprises a solvent which comprises water, one or more alcohols, glycol, or a combination thereof.

34. The method of claim 24, wherein the composition comprises up to about 60% by weight of nonvolatile components.

35. The method of claim 24,
   wherein the composition comprises nonvolatile components including the particles; and
   wherein the particles are at most about 25% by weight of the nonvolatile components of the composition.

36. The method of claim 24, wherein the applying step comprises spraying the composition onto the surface.

* * * * *